G. F. ZUCKER.
ENGINE SUPPORT CLAMP.
APPLICATION FILED DEC. 20, 1919.
1,373,546.
Patented Apr. 5, 1921.
2 SHEETS—SHEET 1.
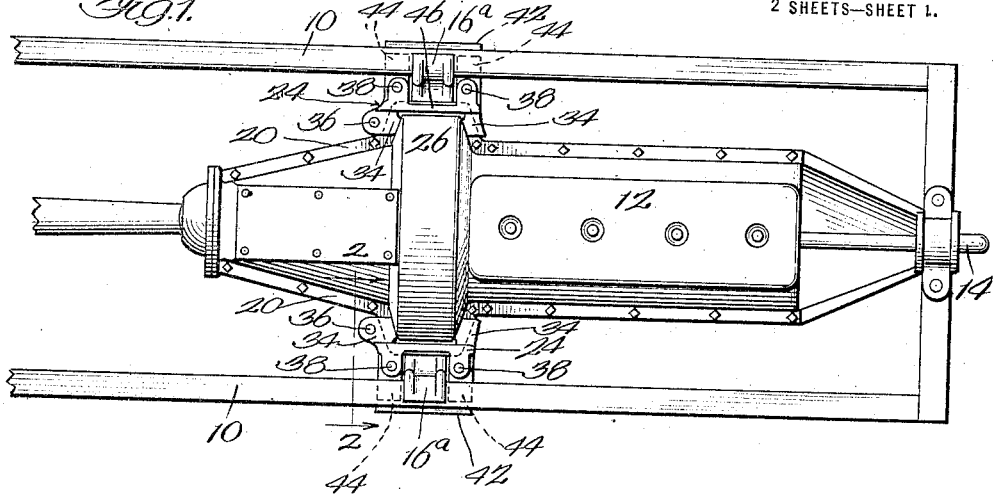
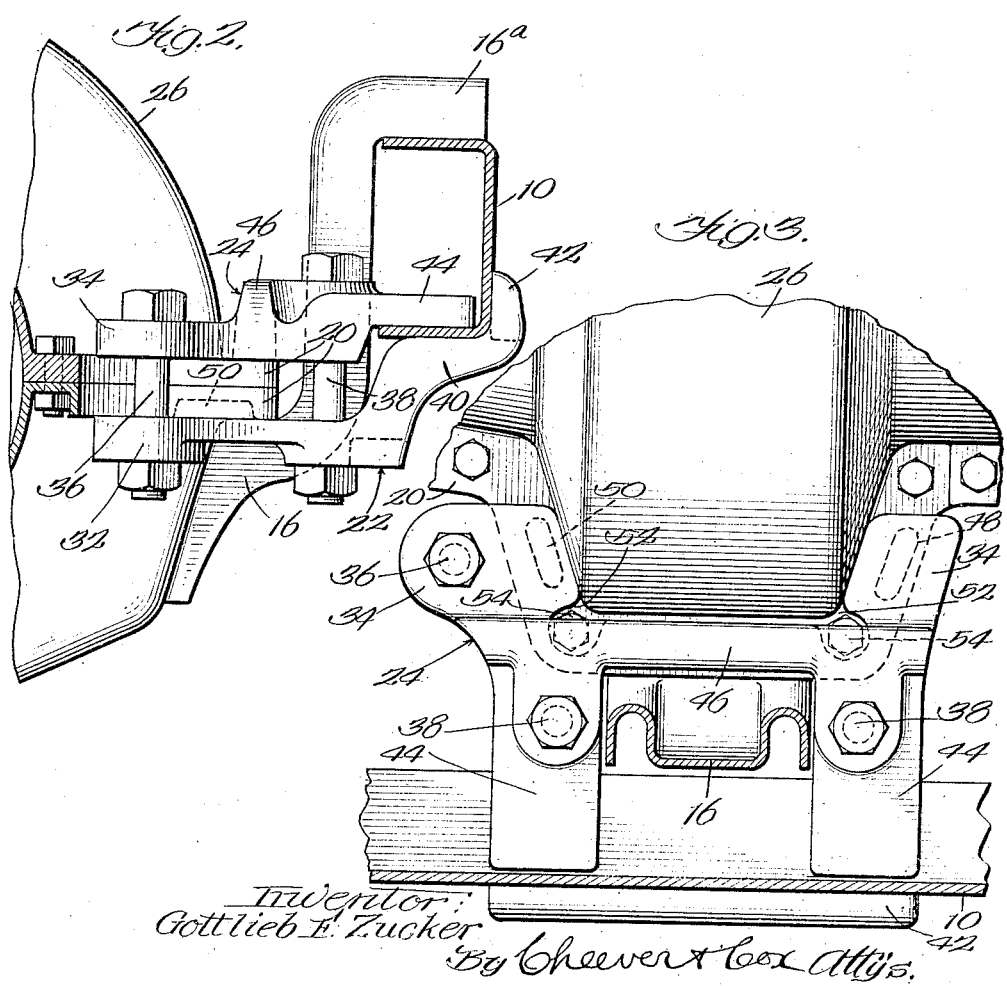
Inventor:
Gottlieb F. Zucker
By Cheever & Cox Att'ys.

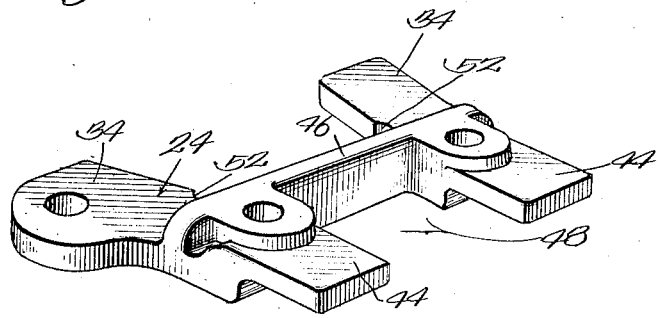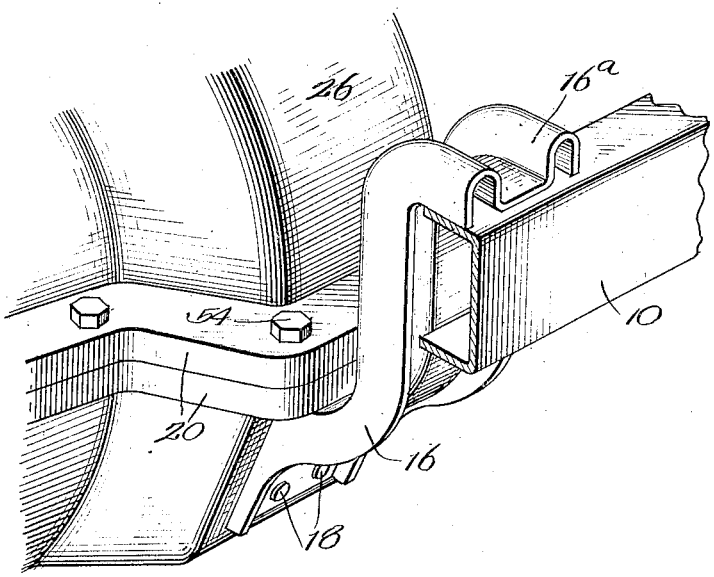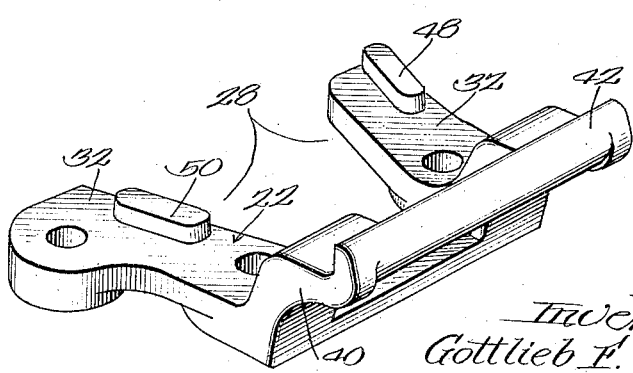

UNITED STATES PATENT OFFICE.

GOTTLIEB F. ZUCKER, OF CHICAGO, ILLINOIS.

ENGINE-SUPPORT CLAMP.

1,373,546.  Specification of Letters Patent.  Patented Apr. 5, 1921.

Application filed December 20, 1919. Serial No. 346,424.

*To all whom it may concern:*

Be it known that I, GOTTLIEB F. ZUCKER, a citizen of the United States, residing at Chicago, in the county of Cook and State of Illinois, have invented a certain new and useful Improvement in Engine - Support Clamps, of which the following is a specification.

This invention is a clamping mechanism for detachably securing the side of an automobile engine to an adjacent frame member on the body of an automobile or the like. While in its specific form shown in the drawing, it is especially designed as a repair part for a particular type of automobile now made and sold in large quantities, the device is capable of application to other machines and to original construction.

The object of the invention is to provide a separable clamp member adapted when separated to be placed above and below an engine portion and a vehicle frame portion respectively, and to be then fastened together to support the engine on the frame, and to so construct the parts that they may be readily applied on the road by an ordinary automobile user whenever the normal supporting device gives out.

The invention consists in means for carrying out the foregoing objects, which can be easily and cheaply made and installed, which is satisfactory in operation and not readily liable to get out of order. More in detail, the invention consists in features and details of construction which will be hereafter more fully set forth in the specification and claims.

Referring to the drawings in which like numerals represent the same parts throughout the several views, Figure 1 is a plan view of an automobile engine frame showing the engine attached thereto in a three-point suspension, two of them being equipped with the mechanism of this invention.

Fig. 2 is a side view taken on the line 2—2 of Fig. 1.

Fig. 3 is an enlarged, detail plan view, certain parts being shown in section, of the mechanism of Fig. 2.

Fig. 4 is a perspective view showing in its central portion, a fragmentary part of the engine, its frame and the normal supporting device used in a well known type of automobile construction before the device of this invention is applied thereto. Above and below this are shown the clamping parts of this invention separated from each other and from the rest of the device.

Fig. 1 shows the usual automobile or engine frame 10 having the standard type of engine 12 attached thereto by a three point suspension, the central suspension 14 being at the end of the frame and the engine. The other two points of suspension comprise, in the absence of the device of this invention, an iron bracket 16 attached to the body of the engine by screws or rivets 18, and thence extending upward, outside the horizontal side flanges 20 of the engine and between them and the frame 10 to a point where the upper end of the bracket 16 bends horizontally in the hook member $16^a$, over the frame member 10. The popular priced automobile of this type of construction made in large quantities is more or less defective in design in that these hooks or brackets 16—$16^a$ are frequently broken, thus allowing the engine to partially or wholly tumble out of the frame 10 with more or less serious results. The mechanism of this invention is produced as the result of long experience with such broken engine suspensions for use either in repairing a suspension already broken and better yet, in supplementing the suspension hook 16—$16^a$ not yet broken so as to insure against such accident. The device comprises two plate members or clamp members 22 and 24 shown clearly in perspective in Fig. 4 and otherwise in the remaining figures.

The engine 12 has its case made with a substantially enlarged portion 26 located opposite the suspension hooks 16, and the engine case flange 20 therefore follows the enlarged contour of this portion 26 at this point. The clamping plates 22 and 24 are therefore made with U-shaped notches 28 and 30 respectively so as to form side arms 32 and 34 respectively embracing the adjacent portion of engine case member 26 and conforming to the engine flange 20 at this point. The arms 32 and 34 are provided with suitable holes to receive bolts 36 and 38 adapted to detachably secure them together in the position clearly shown in the drawing, particularly Fig. 2. The lower plate 22 has an upwardly turned portion 40 which bears against the underside of body frame member 10 and this part 40 is provided with an upwardly turned flange 42 adapted to embrace the outer side of member 10. On the other hand, plate 24 is provided with horizontally extending arms 44 adapted to enter the inside of frame member 10 which is, as clearly shown in Fig. 2, channel shaped. All the parts are so constructed that by tightening bolts 38 which are located intermediate of the engine flange 20 and frame member 10, a very positive clamping action is obtained. The notch 28, heretofore referred to, in lower plate 22, is carried sufficiently deep so that, as clearly shown in Fig. 3 and elsewhere, this plate can be fitted in position by simply slipping it in place from the right as viewed in Fig. 2. On the other hand, upper plate member 24 is more or less H-shaped, the notch 30, heretofore referred to, being on one side of the cross bar 46, while the lugs 44 are spaced apart to form the recess 48 on the other side of the cross bar within which upright portion of bracket 16 lies when the parts are assembled.

Plate member 22 is also provided with upwardly extending lugs 48 and 50 adapted to enter recesses in the lower side of lower member 20 formed there in the particular structure shown and thus assist in positioning the device in installation and holding the parts in place when they are finally assembled. The plate members are without novelty recessed at 52 and elsewhere as needed to clear bolts 54 used in the normal engine flange construction.

In the operation of the device, the operator places, adjacent to the mechanism to be equipped with a clamp of this invention, the clamp parts shown in Fig. 4. He then takes the lower plate member 22 and applies it to the position shown in Figs. 2 and 3. He then takes the upper member 24 and puts it in the position shown in Fig. 2 whereupon he inserts the bolts 36 and 38 and tightens them up with the result that the engine is firmly secured to the body frame member 10 regardless of the presence or absence of bracket member 16. The device is especially valuable in that it may be carried as a repair part with the automobile and may be applied on the road without removing bracket member 16, partly or wholly broken in an accident. Also in that it may be applied before starting on a trip or in original construction. The importance of the device will be seen when it is stated that if one bracket 16 breaks, it causes the radiator hose to break and let the water out of the engine with serious results well understood in the art.

Having thus described my invention what I claim as new and desire to secure by Letters Patent, is:—

1. In combination with an automobile or engine frame member, an engine adjacent thereto, and a normal supporting device from the engine to the frame, a clamping element comprising coöperating members extending between the engine and frame and each embracing the normal supporting device, and means for drawing said members together.

2. In combination with an automobile or engine frame member, an engine adjacent thereto, and a normal supporting device from the engine to the frame, coöperating clamping members each extending between the engine and frame and around a plurality of sides of the normal supporting device, and means for drawing said members together.

3. An auxiliary support for securing an engine to an engine frame comprising coöperating clamping members adapted to be drawn together by bolts and to simultaneously clamp therebetween portions of an engine and an engine frame, said members being provided with open portions disposed in registration when the members are in clamping relation with respect to an engine and frame to provide a passage for receiving a normal support between an engine and engine frame.

4. In mechanism of the class described, in combination with an automobile or engine frame member, an engine member inside the frame member having an enlarged portion adjacent to the frame member, and a normal supporting device between said enlarged portion of the engine and the frame member; a U-shaped clamping plate adapted to fit from the outside against the frame member and about the normal support and about the enlarged engine portion, and another clamping plate adapted to fit over the first plate and embrace both the normal support and the enlarged engine portion, and means for detachably securing the two plates in position to support the engine from the frame member independent of the original normal supporting device.

5. In mechanism of the class described, in combination with an engine, a hook attached to the engine, a frame member on which the hook rests to support the engine; a U-shaped member fittable against the frame member and embracing the hook member and a portion of the engine against which it takes bearing to support the engine, and an H-shaped clamping member fittable on top of the first member, bearing on said frame member embracing the supporting hook and bearing on the engine, and means for securing said two parts together, for the purposes set forth.

In witness whereof I have hereunto subscribed my name in the presence of two witnesses.

GOTTLIEB F. ZUCKER.

Witnesses:
 Dwight B. Cheever,
 Minnie Sternberg.